Patented Nov. 4, 1924.

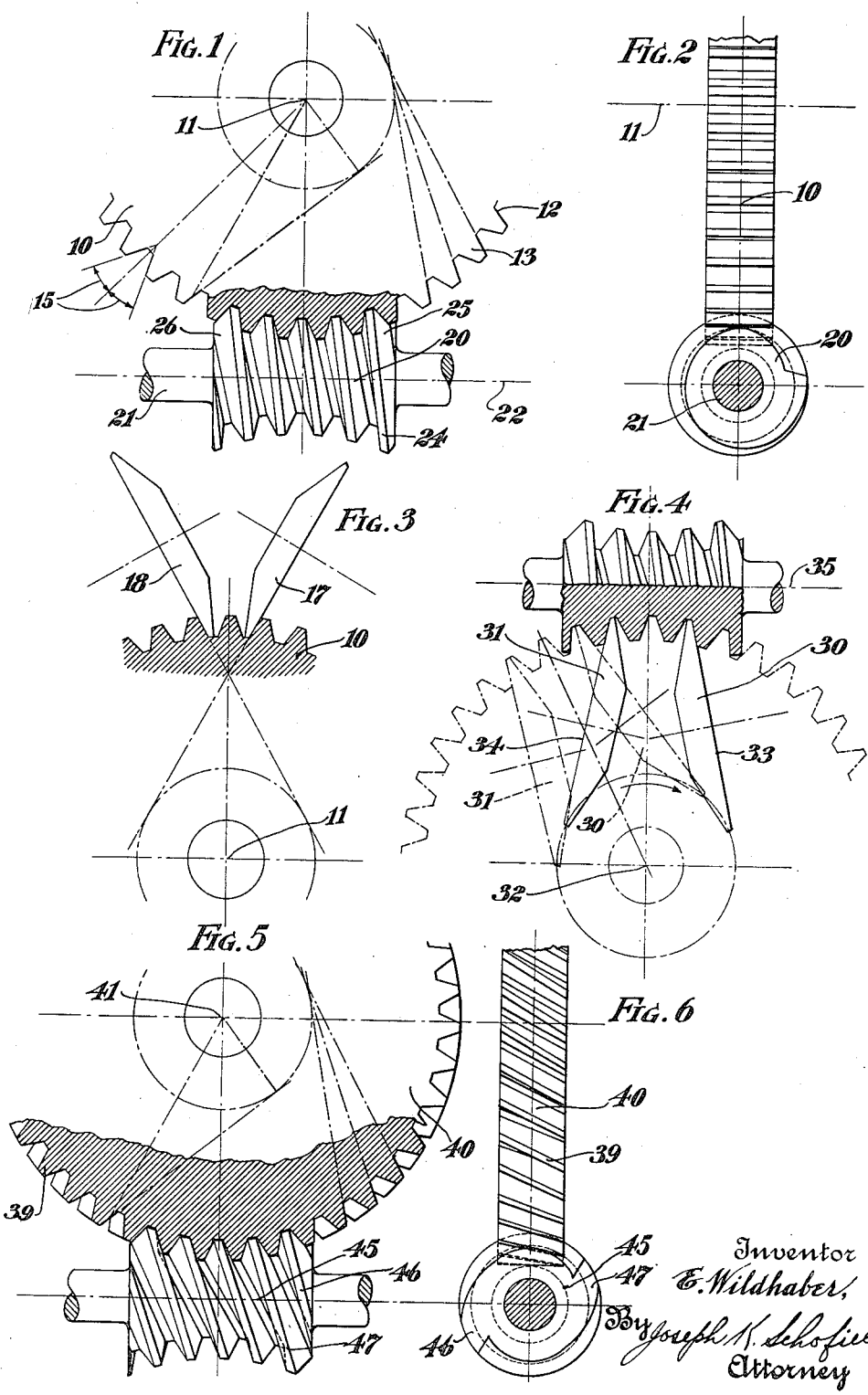

1,514,491

UNITED STATES PATENT OFFICE.

ERNEST WILDHABER, OF BROOKLYN, NEW YORK, ASSIGNOR TO NILES-BEMENT-POND COMPANY, OF NEW YORK, N. Y., A CORPORATION OF NEW JERSEY.

WORM GEARING.

Application filed February 21, 1921, Serial No. 446,576. Renewed April 10, 1924.

*To all whom it may concern:*

Be it known that I, ERNEST WILDHABER, a citizen of the Republic of Switzerland, and a resident of Brooklyn, in the county of Kings and State of New York, have invented certain new and useful Improvements in Worm Gearing, of which the following is a specification.

This invention relates to gearing and in particular to a new form of precision worm gearing.

It is an object of the present invention to form the members of a system of worm gearing with surfaces that can be easily cut and ground so that both members of the system will be formed to a high degree of precision.

Another object of the invention is to provide worm gearing in which the tooth flanks of the worm wheel constitute planes disposed at an acute angle to each other and at acute angles to corresponding axial planes intersecting the teeth.

Another object of the invention is to provide a worm generated for proper intermeshing relation with the above described worm wheel which will give a long and continuous contact, the contact between the worm and worm wheel being a straight line contact on each tooth engaged by the worm.

Another object of the invention is to provide a system of gearing permitting generating a conjugate worm either by grinding or milling its worm wheel engaging surfaces. The method of generating the worm preferably comprises mounting grinding wheels or milling cutters so that their cutting edges are in positions assumed by the plane flanks of the worm wheel and then rotating these cutters, or wheels, about an axis corresponding to the axis of a worm wheel.

One of the advantages of my invention is that the worm wheels made in accordance with the present invention may be easily and quickly made having their tooth flanks in the form of plane surfaces either parallel to or at an oblique angle to the axis of rotation of the gear wheel. Another feature of importance is that the worm wheel, by reason of its teeth being in the form of planes, can be easily tested for accuracy of tooth spacing and thickness and, during the operation of making the worm wheel it may be indexed in the usual step-by-step manner by means of an ordinary form of indexing mechanism with a high degree of precision.

For a large ratio of reduction between a worm and worm wheel made in accordance with the present invention, I preferably employ a form of my invention in which the planes of the worm wheel teeth are tangent to a cylinder disposed coaxially to the axis of the worm wheel. In systems in which the reduction of the worm and wheel is relatively small, I preferably employ a form of worm wheel in which the teeth are oblique to the axis of the worm wheel but plane, that is, having teeth similar to "skew" teeth.

With these and other objects in view, my invention comprises the features of construction and operation set forth in the following specification and illustrated in the accompanying drawing.

In the accompanying drawing annexed hereto and forming a part of this specification, I have shown my invention embodied in two separate forms of worm gearing having respectively a single and double helix worm, but it will be understood that the invention can be otherwise embodied and that the drawing is not to be construed as defining or limiting the scope of the invention, the claims appended to this specification being relied upon for that purpose.

In the drawing:

Figure 1 shows a view partly in section of a worm and a worm wheel made in accordance with one of the modifications of the present invention.

Fig. 2 shows an end view of the worm and worm wheel shown in Fig. 1.

Fig. 3 shows diagrammatically a method of producing the flanks of the teeth on the periphery of the worm wheel.

Fig. 4 shows diagrammatically a method of forming the flanks of the thread-like projection on a worm made in accordance with the present invention.

Fig. 5 shows a view similar to Fig. 1 of another modification of the invention.

Fig. 6 shows a view similar to Fig. 2 of the modified form of the invention shown in Fig. 5.

In the accompanying drawing, I have shown but two modifications of the invention which are now deemed preferable but it is to be understood that changes and modifications may be made within the scope of the appended claims both as to the construction of the worm and worm wheel and as to the methods of forming them without departing from the spirit of the invention.

Briefly, my new form of gearing in its broadest aspect comprises, first; a worm wheel having plane or flat surfaces on the flanks of its teeth, and, second; a worm generated to properly intermesh with said worm wheel and give a uniform speed to the worm wheel relative to the speed of the worm and at a predetermined ratio thereto.

In the usual or common method of forming the members of a system of worm gearing, the worm is first formed having a thread on its surface, and the worm wheel is then formed by means of a hob having cutting surfaces made to correspond with the helix of the worm. In the present instance, the worm wheel is first made. Then a globoidal worm is generated in a device the worm engaging surfaces of the cutting tools of which are positioned to correspond with the tooth surfaces of the worm wheel. The result is that both members of the present system may be accurately formed directly from cutting surfaces in the form of planes.

Referring first to the form of the invention shown in Figs. 1 and 2, a worm wheel is shown at 10 having plane tooth flanks extending parallel to the axis 11 about which the wheel 10 is mounted to be rotated. As shown clearly in Figs. 1 and 2, the flanks 12 of teeth 13 are plane surfaces and may be formed by any convenient means such as by a milling cutter, or, as shown in Fig. 3, by the action of grinding wheels. The teeth 13 on this gear 10 are equally spaced and are similar in section to the teeth of a rack. By reason of these plane surfaced flanks, the teeth 13 may be formed accurately and easily and in theoretically correct position by the simple means above mentioned. Any angle such as shown at 15 may be utilized for the flanks 12 of the teeth 13 but I preferably form these flanks at an angle of approximately 15° or 20° from radial planes intersecting the flanks. The planes forming the flanks 12 of the gear teeth 13 are most easily formed by cutting surfaces of milling cutters or grinding wheels mounted to rotate about axes normal to the axis 11 and passed through the gear 10 at a proper depth in a direction parallel with the gear axis 11. This method of forming the teeth 13 is clearly shown in Fig. 3, in which 17 and 18 represent milling cutters or grinding wheels.

A worm adapted to engage the worm wheel 10 is shown at 20. This is preferably formed integral on its shaft 21 and is adapted to be mounted to rotate about an axis 22 at right angles to the axis 11 of the worm wheel 10. The worm 20 is formed with a continuous thread like projection 24 extending about the worm 20 from end to end. The lateral surfaces or flanks of this projection 24 which are shown at 25 and 26 contact with the flanks 12 of the teeth 13 of worm wheel 10 and these surfaces 25 and 26 are so generated that they will intermesh properly with the gear 10 and contact with the flanks 12 on gear 10 throughout the arc of contact of worm 20 with worm wheel 10. The surfaces 25 and 26 are not of true helicoidal form but are peculiar warped surfaces which are generated in a novel manner to give a correct conjugate form to their surfaces relative to the flanks 12 of worm wheel 10. The general shape of worm 20 is of the globoidal or hour-glass worm type, and the projection 24 is adapted to contact with the teeth 13 of gear 10 with line contact on each of the teeth 13 engaged by the worm. Each of the teeth 13 on gear 10 within the arc subtended by the worm 20 is engaged by a portion of the projection 24.

In Fig. 4, a diagrammatical view is shown of the method of generating a worm made in accordance with the present invention. In carrying out the process of generation, milling cutters, or grinding wheels 30 and 31, are mounted to be rotated about an axis 32. Their outer surfaces 33 and 34, which are adapted to engage and cut the worm, are so positioned that they occupy planes corresponding to opposite sides of the worm wheel teeth 13 similar in every way to those shown in Fig. 1. It will be understood that the position of the wheels 30 and 31 may be adjusted radially and laterally so that the cutting surfaces 33 and 34 may be adjusted to correspond to the flank sufaces of different gears. In cutting any one worm, the wheels 30 and 31 are so positioned that their cutting surfaces correspond precisely to planes of the tooth flanks of the particular gear with which that worm is designed to cooperate. Also the wheels 30 and 31 are adjusted to cut into the worm 20 to a proper depth to mesh correctly with worm wheel 10.

With the wheels 30 and 31 adjusted in position as above described, the worm is rotated about an axis 35 and the wheels 30 and 31 are rotated about the axis 32 (see Fig. 4). The axis 32 corresponds exactly to the axis of the gear wheel with which the worm is adapted to mesh. The rotation of the worm such as 20 and the rotation of the wheels 30 and 31 about axis 32 are in timed relationship to each other, this relation corresponding exactly to the ratio of the worm and worm wheel being made. It will be seen from the method of generating the worm shown in Fig. 4 that the worm will mesh with the worm wheel on the same lines of contact as those developed by the plane cutting surfaces of the wheels 30.

Coming now to a description of the worm and worm wheel shown in Figs. 5 and 6, it will be seen that these are respectively of the same general type as shown in Figs. 1 and 2. However, the teeth 39 of the gear 40 shown in Fig. 5 are in planes at an oblique angle to the axis 41 of the gear wheel. The gear 40, however, is not a helical gear and the flanks of the teeth 40 are not helicoidal surfaces but are plane surfaces oblique to a cylinder coaxial with the axis of the gear 41 and are therefore what might be called "skew" teeth. This form of the teeth is shown clearly in Fig. 6.

The worm shown at 45 is generated in the same general manner and by the same device as indicated in Fig. 4. In generating this worm, however, the wheels 30 and 31 are disposed obliquely to the axis 32, the angle of obliquity corresponding precisely to the oblique angle formed by the flanks of the skew teeth on worm wheel 40. The worm 45 is shown as having a double thread or forming a two tooth worm, but it is obvious that worms of different form may be used and that the invention is applicable to either single or multiple tooth worms.

The two teeth 46 and 47 of worm 45 have their flanks formed at acute angles to each other but, as shown in Fig. 5, the teeth have a much greater helix angle or angle relative to the axis of the worm than the worm 20 shown in Fig. 1.

For large speed reductions between the worm and worm wheel, I preferably utilize a single worm and provide the teeth on the worm wheel as extending in directions parallel to the worm wheel axis and, for small speed reductions, I prefer to use the form of the invention shown in Figs. 5 and 6 preferably with a multiple tooth worm, and with the worm wheel provided with teeth arranged at oblique angles to the axis of the wheel.

From the above, it will be seen that two modifications of a system of gearing have been disclosed each of which permits the members of the system to be accurately formed by simple and convenient means. Furthermore, the system permits first forming the worm wheel to the highest possible precision and then generating a correct conjugate form for the worm by simple means.

What I claim is:

1. A system of gearing comprising in combination, a worm wheel having plane sided teeth, and a worm generated to intermesh therewith.

2. A system of gearing comprising in combination, a worm wheel having plane sided teeth, and a worm generated to intermesh upon straight line contact therewith.

3. A system of gearing comprising in combination, a worm wheel having plane sided teeth the sides of each tooth being at an acute angle to each other, and a worm generated to intermesh therewith.

4. A system of gearing comprising in combination, a worm wheel having plane sided teeth, and a globoidal worm generated to intermesh therewith.

5. A system of gearing comprising in combination, a worm wheel having equally spaced plane sided teeth, and a worm generated to intermesh with a plurality of adjacent teeth thereon.

6. A system of gearing comprising in combination, a worm wheel having equally spaced plane sided teeth, and a worm generated to intermesh with said worm gear upon straight line contact with a plurality of adjacent teeth thereon.

7. A system of gearing comprising in combination, a worm wheel having plane sided teeth, the planes of said teeth being parallel to the axis of said wheel, and a worm generated to intermesh therewith.

8. A system of gearing comprising in combination, a worm wheel having plane sided teeth, the planes of the sides of said teeth being parallel to the axis of said wheel and the sides of each tooth being at an acute angle to each other, and a worm generated to intermesh therewith.

9. A system of gearing comprising in combination, a worm wheel having plane sided teeth, the planes of the sides of said teeth being parallel to the axis of said wheel and the sides of each tooth being at an acute angle to each other, and a worm generated to intermesh upon straight line contact with a plurality of adjacent teeth thereon.

10. A system of gearing comprising in combination, a worm wheel having plane sided teeth, the planes of the sides of each of said teeth being parallel to the axis of said wheel and tangent to a coaxial cylinder, and a worm generated to intermesh with a plurality of adjacent teeth thereon.

11. A system of gearing comprising in combination, a worm wheel, and a worm adapted to intermesh therewith, said worm comprising a globoidal body having a continuous thread-like projection on its surface the sides of said projection being generated by rotating said worm adjacent cutting wheels having their cutting surfaces disposed in the planes assumed by opposite sides of the teeth of a worm wheel with which said worm is adapted to intermesh.

12. A system of gearing comprising in combination, a worm wheel, and a worm adapted to intermesh therewith, said worm comprising a globoidal body having a continuous thread-like projection on its surface extending from end to end of said worm and generated by rotating said worm adjacent cutting wheels having their cutting surfaces disposed in the planes assumed by opposite sides of the teeth of a worm wheel with which said worm is adapted to intermesh.

13. A system of gearing comprising in combination, a worm wheel having plane sided teeth, and a worm adapted to intermesh therewith, said worm comprising a globoidal body having a continuous thread-like projection on its surface generated by rotating said worm adjacent cutting wheels whose cutting surfaces are disposed in planes parallel to the axis of said worm wheel and at acute angles to each other.

14. A system of gearing comprising in combination, a worm wheel and a worm adapted to intermesh therewith, said worm comprising a globoidal body having a continuous thread-like projection on its surface generated by rotating said worm adjacent a pair of symmetrically disposed cutting wheels mounted so that their cutting surfaces are in the planes occupied by opposite sides of the teeth of a worm wheel with which said worm is adapted to intermesh.

15. A system of gearing comprising in combination, a worm wheel having equally spaced plane sided teeth in planes oblique to the axis of said worm wheel, and a worm adapted to intermesh therewith, said worm comprising a globoidal body having a continuous thread-like projection on its surface generated by rotating said worm adjacent cutting wheels having their cutting surfaces disposed in the planes assumed by opposite sides of the teeth of the particular worm wheel with which said worm is adapted to intermesh.

In testimony whereof, I hereto affix my signature.

ERNEST WILDHABER.